(12) United States Patent
Brin et al.

(10) Patent No.: US 8,629,815 B2
(45) Date of Patent: Jan. 14, 2014

(54) LASER ALIGNMENT OF BINOCULAR HEAD MOUNTED DISPLAY

(75) Inventors: Sergey Brin, Palo Alto, CA (US); Babak Amirparviz, Mountain View, CA (US)

(73) Assignee: Google Inc., Mountain View, CA (US)

( * ) Notice: Subject to any disclaimer, the term of this patent is extended or adjusted under 35 U.S.C. 154(b) by 393 days.

(21) Appl. No.: 13/206,338

(22) Filed: Aug. 9, 2011

(65) Prior Publication Data

US 2013/0038510 A1 Feb. 14, 2013

(51) Int. Cl.
*G09G 5/00* (2006.01)

(52) U.S. Cl.
USPC .................................. 345/8; 345/156; 715/848

(58) Field of Classification Search
USPC .............. 345/8, 156, 419, 629, 633; 715/848
See application file for complete search history.

(56) References Cited

U.S. PATENT DOCUMENTS

| | | | |
|---|---|---|---|
| 5,739,797 A * | 4/1998 | Karasawa et al. | 345/8 |
| 5,751,259 A * | 5/1998 | Iwamoto | 345/8 |
| 5,943,171 A | 8/1999 | Budd et al. | |
| 5,949,583 A | 9/1999 | Rallison et al. | |
| 6,690,516 B2 | 2/2004 | Aritake et al. | |
| 2005/0174651 A1 | 8/2005 | Spitzer et al. | |
| 2008/0024391 A1 * | 1/2008 | Oliver et al. | 345/8 |
| 2010/0046070 A1 | 2/2010 | Mukawa | |
| 2010/0097580 A1 * | 4/2010 | Yamamoto et al. | 353/69 |
| 2010/0149073 A1 | 6/2010 | Chaum et al. | |
| 2011/0213664 A1 | 9/2011 | Osterhout et al. | |

FOREIGN PATENT DOCUMENTS

| | | |
|---|---|---|
| JP | 2009-523344 A | 6/2009 |
| JP | 2010-145859 A | 7/2010 |
| WO | WO 03/082083 A1 | 10/2003 |

OTHER PUBLICATIONS

PCT/US2012/046371; PCT International Search Report and Written Opinion of the International Searching Authority, mailed Jan. 23, 2013, 9 pages.

* cited by examiner

*Primary Examiner* — Kevin M Nguyen
*Assistant Examiner* — Cory Almeida
(74) *Attorney, Agent, or Firm* — Blakely Sokoloff Taylor & Zafman LLP (57) ABSTRACT

A binocular head mounted display includes a frame, right and left displays, an alignment sensor, and a control system. The right and left displays display right and left images to a user and are mounted to the frame. The alignment sensor includes a first laser source mounted proximate to one of the right or left displays and a first photo-detector array mounted opposite the first laser source and proximate to an opposite one of the right or left displays. The first alignment sensor is mounted to measure misalignment between the right and left displays due to deformation of the frame about one or more rotational axes and to generate a signal that is indicative of the misalignment. The control system is coupled to the alignment sensor to receive the signal and to calculate the misalignment based at least in part upon the signal.

28 Claims, 6 Drawing Sheets

LASER ALIGNMENT OF BINOCULAR HEAD MOUNTED DISPLAY

TECHNICAL FIELD

This disclosure relates generally to head mounted displays, and in particular but not exclusively, relates to binocular head mounted displays.

BACKGROUND INFORMATION

A head mounted display ("HMD") is a display device worn on or about the head. HMDs usually incorporate some sort of near-to-eye optical system to display an image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD is often referred to as augmented reality because the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. Due to the infancy of this technology, there is certain to be new found practical and leisure applications as the technology evolves; however, many of these applications are currently limited due to the cost, size, field of view, and efficiency of conventional optical systems used to implemented existing HMDs, as well as, other technological hurdles that have yet to be adequately solved before HMDs will have widespread adoption in the marketplace.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for sensing alignment between eye pieces of a binocular head mounted display ("HMD") are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

One technological hurdle to overcome to further encourage marketplace adoption of HMD technology is identifying and compensating for binocular HMD deformation. Deformation of a binocular HMD can lead to deleterious misalignment between the left and right image displays of the binocular HMD. These misalignments can result in a blurred or otherwise compromised image as perceived by the user, which ultimately leads to a poor user experience (disorientation, dizziness, etc.). Deformation can occur due to a variety of reasons including misuse, poor user fit, nonsymmetrical facial features, harsh environmental factors (e.g., thermal warping), or otherwise.

For example, if a binocular HMD is too narrow for a given user's head, the user's head will assert outward forces on each of the ear arms of the binocular HMD causing the ear arms to spread, thereby flexing the frontal display section about the nose bridge. To a lesser extent, the opposite effect, by the ears applying an inward compressing force to the ear arms, can occur if the user's head is too narrow. Additionally, if the user's ears are not symmetrical (i.e., one ear is higher than the other), a torsion force can be applied to the ear arms causing the left and right sides of the binocular HMD to twist about the nose bridge. Both of these rotational deformations can result in misalignment between the right and left displays of a binocular HMD.

Figure 1:
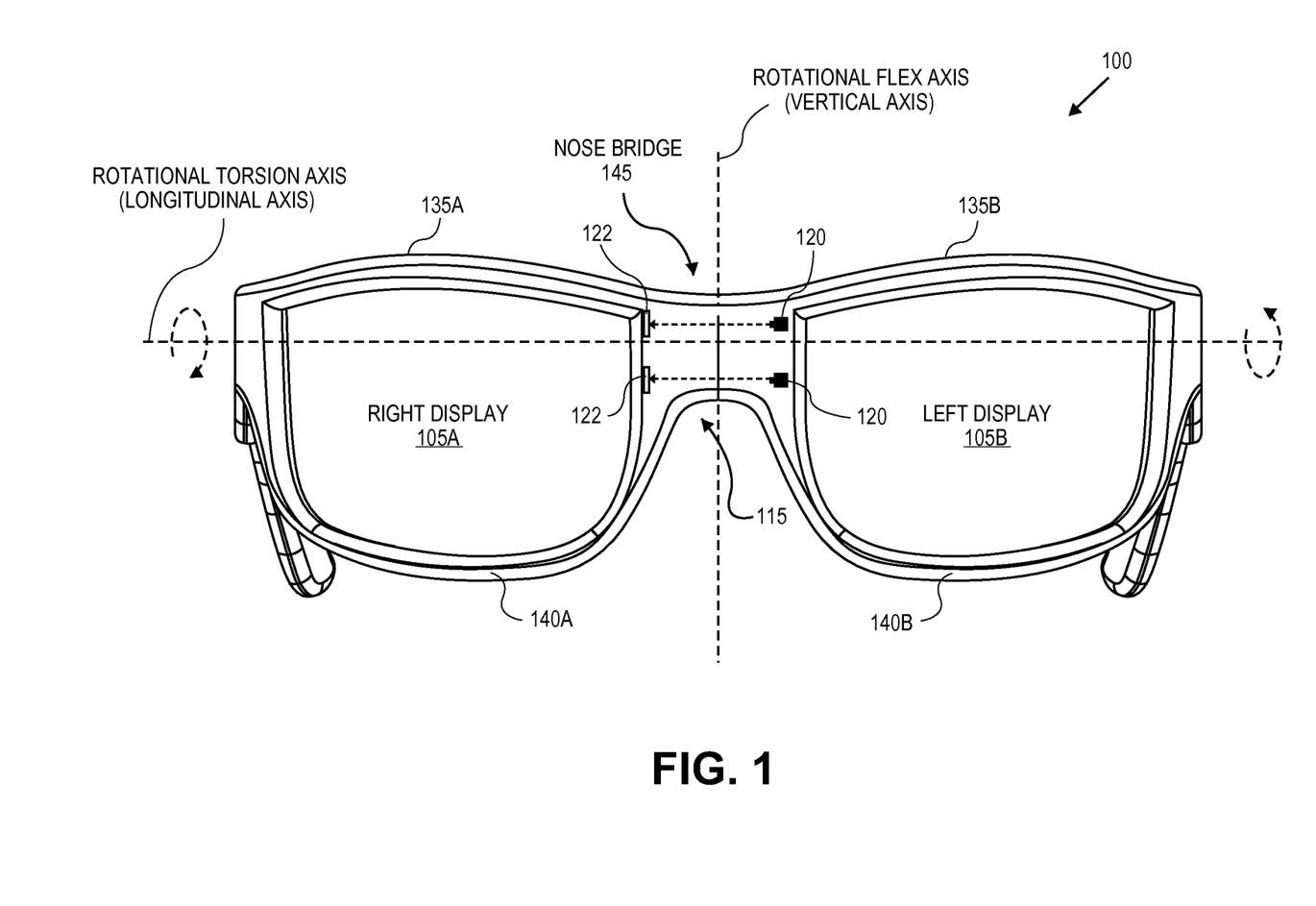
FIG. 1 is a frontal view of a head mounted display with laser alignment sensors, in accordance with an embodiment of the disclosure.
Figure 2:
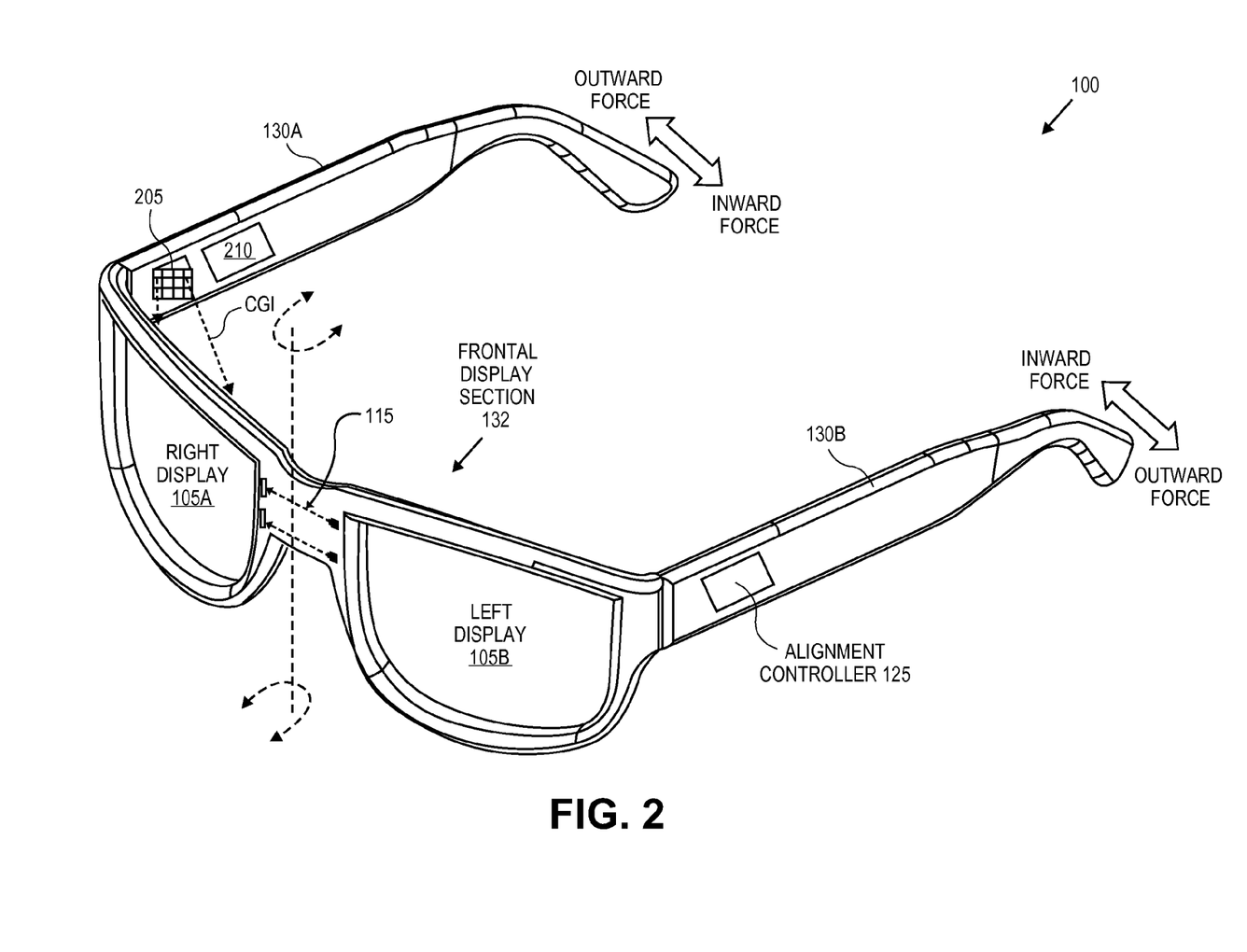
FIG. 2 is a perspective view of a head mounted display with laser alignment sensors, in accordance with an embodiment of the disclosure.
Figure 3:
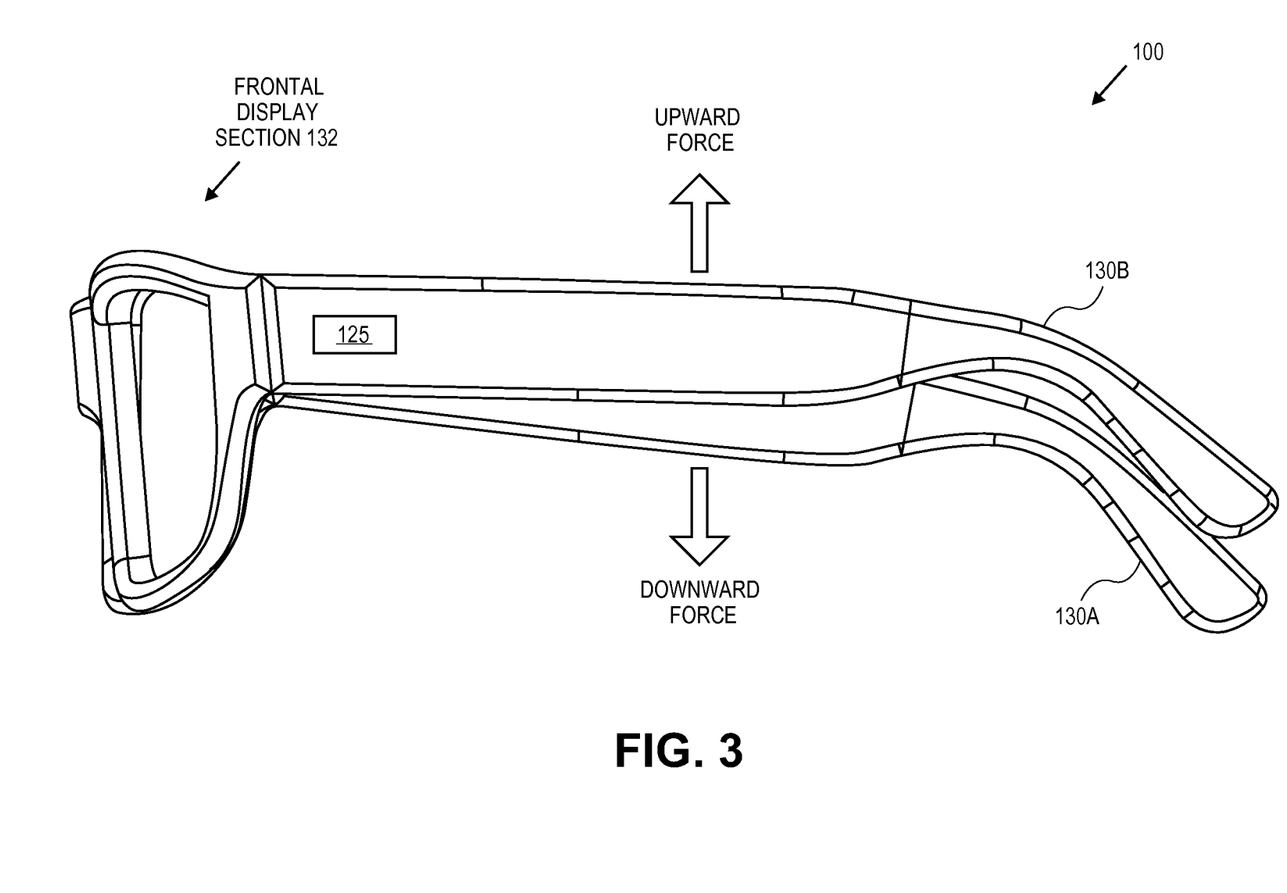
FIG. 3 is a side view of a head mounted display with laser alignment sensors illustrating a torsional deformation of a frame of the head mounted display, in accordance with an embodiment of the disclosure.

FIGS. 1-3 illustrate various views of an example binocular HMD 100, in accordance with an embodiment of the disclosure. FIG. 1 is a frontal view, FIG. 2 is perspective view, and FIG. 3 is a side view of binocular HMD 100. The illustrated embodiment of binocular HMD 100 includes right display 105A and left display 105B (collective displays 105), a laser alignment sensor system 115, an alignment controller 125 (FIG. 2 or 3), and a frame. The illustrated embodiment of laser alignment sensor system 115 includes two laser alignment sensors, which each include a laser source 120 and a photo-detector array 122. The illustrated embodiment of the frame includes right ear arm 130A and left ear arm 130B (collectively ear arms 130), and a frontal display section 132. The illustrated embodiment of frontal display section 132 includes right upper display support 135A and left upper display support 135B (collectively upper display supports 135), right lower display support 140A and left lower display support and 140B (collectively lower display supports 140), and a nose bridge 145. Although FIGS. 1-3 illustrate a traditional eyeglass shaped frame, embodiments of the present invention are applicable to a wide variety of frame types and styles. For example, lower display supports 140 may be omitted, upper display supports 135 may be omitted, displays 105 may be rigid optical eye pieces that also function as structural frame members themselves, the frame may assume a visor-like shape, or otherwise.

Displays 105 may be implemented using a variety of different binocular display technologies. For example, displays 105 may be implemented as semi-transparent optical elements or opaque optical elements. The semi-transparent optical element embodiments permit external light to pass through to the eyes of a user to provide a real-world view, but also display a super-imposed computer generated image ("CGI") over the real-world view. This type of display technology is often referred to as a heads up display ("HUD") or augmented reality. The semi-transparent optical element embodiments can further be defined into emissive embodiments (e.g., sheet of transparent organic light emitting diodes ("OLEDs")) or reflective embodiments. FIG. 2 illustrates a reflective embodiment where image sources 205 project the CGIs onto displays 105, which reflect the CGIs back towards the eyes of the user. Other reflective embodiments may use various types of waveguides to transport the CGIs from a peripheral location near ear arms 130 to a location in front of the user's eyes. Image sources 205 may be implemented using liquid crystal on silicon ("LCoS") image panels, pico-projectors, LED arrays, or otherwise. Embodiments that include opaque optical elements do not permit external light to pass through displays 105, but rather only transmit the CGIs to the user eyes. These types of HMDs are often referred to as virtual reality HMDs. In both semi-transparent and opaque optical element embodiments, display controllers 210 may be used to drive displays 105 and render the CGIs. Of course, other display technologies may be used and even hybrid devices may be used that can switch back-and-forth between semi-transparent and opaque modes of operation may be implemented.

As discussed above, binocular HMD 100 may deform during use or overtime due to a number of environmental factors or use scenarios. As illustrated in FIGS. 1 and 2, binocular HMD 100 may be deformed about a rotational flex axis (or vertical axis) that passes through nose bridge 145. Nose bridge 145 is typically a structural weak point in the central portion of frontal display section 132 between right and left displays 105. By applying an inward force on ear arms 130, frontal display section 132 will flex at nose bridge 145 and pivot or rotate back about the rotational flex axis. Correspondingly, outward forces applied to ear arms 130 will cause frontal display section 132 to flex about nose bridge 145 and pivot or rotate forward about the rotational flex axis. These forces may occur if binocular HMD 100 is not properly fitted for the user (e.g., users head is too small or too large). Additionally, binocular HMD 100 may deform about a rotational torsion axis (or longitudinal axis) that passes through nose bridge 145. Referring to FIGS. 1 and 3, by applying opposing upward and downward forces to ear arms 130, frontal display section 132 will twist at nose bridge 145 about the rotational torsion axis. These forces may occur if binocular HMD 100 is not properly fitted for a user who has uneven ears. The rotational flex deformation and the rotational torsion deformation are generically referred to herein as rotational deformations about rotational axes.

Laser alignment sensor system 115 is disposed proximate to displays 105 to measure misalignment between the right and left displays 105 due to deformation of the frame about the rotational deformation axes. Laser alignment sensor system 115 may be implemented with a single laser alignment sensor (e.g., single paired laser source 120 and photo-detector array 122), a pair of laser alignment sensors (illustrated), or more than two laser alignment sensors. The use of multiple laser alignment sensors improves the sensitivity of laser alignment sensor system 115 and can increase the number of deformation axes that can be monitored by laser alignment sensor system 115.

In the illustrated embodiment, laser sources 120 are mounted proximate to left display 105B and photo-detectors 122 are mounted opposite laser sources 120 proximate to right display 105A. Of course, in other embodiments, mounting locations/orientations may be swapped, alternated, or otherwise changed up. Laser sources 120 direct light beams across node bridge 145 to impinge on their corresponding photo-detectors 122. Since laser sources 120 are rigidly coupled to left display 105B and photo-detectors 122 are rigidly coupled to right display 105A, any flexing or torsion about nose bridge 145 is sensed by photo-detector arrays 122 as a movement in the impinging light beams. The greater the displacement of each impinging light beam from its default location or calibrated location, the greater the deformation of the frame. Output signals from both photo-detector arrays 122 can be collectively analyzed to determine the direction and magnitude of the deformation and consequential relative misalignment of displays 105.

Figure 4:
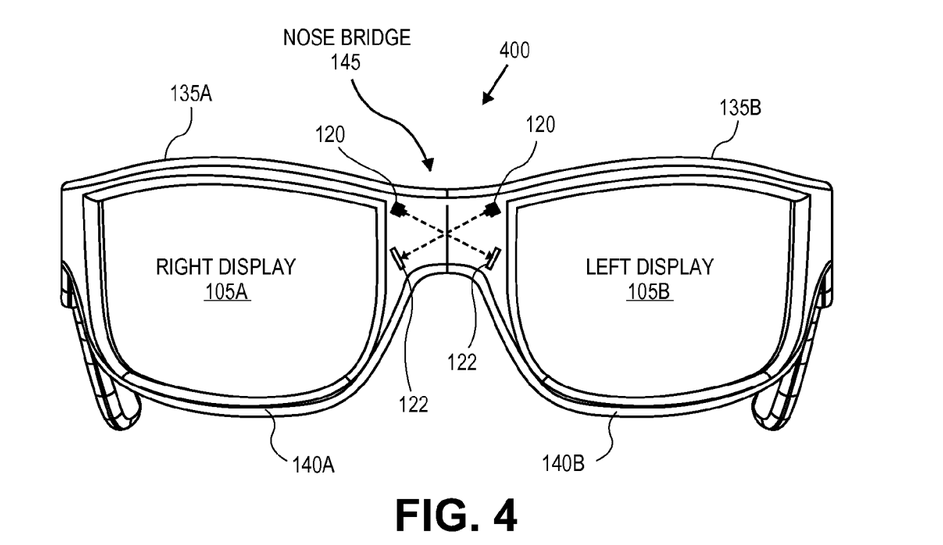
FIG. 4 is a frontal view of a head mounted display with laser alignment sensors oriented to measure misalignment diagonally across a central nose region of a frame of the head mounted display, in accordance with an embodiment of the disclosure.

FIG. 4 illustrates an alternative diagonal arrangement 400 of laser sources 120 and photo-detectors 122, in accordance with an embodiment of the disclosure. FIGS. 1-3 illustrate a substantially parallel path for light beams that optically registers the upper portions of displays 105 to each other and optically registers the lower portions of displays 105 to each other. In contrast, diagonal arrangement 400 illustrated in FIG. 4 optically registers the upper portion of one display to the lower portion of the other display by directing the light beams diagonally across nose bridge 145. Diagonal arrangement 400 can improve sensitivity and the number of measurable axes of deformation versus the parallel path arrangement disclosed in FIGS. 1-3.

Laser sources 120 and photo-detectors 122 may be disposed on the frontside (illustrated) or backside surface of frontal display section 132 near to display 105. Alternatively, nose bridge 145 may be fabricated of a clear material (e.g., clear plastic) or include an interior hollow cavity permitting laser sources 120 and photo-detectors 122 to be embedded within the frame structure itself. Laser sources 120 and photo-detectors 122 may be mounted directly to displays 105 or to portions of the frame near to displays 105. In either case, the mounting location should provide a sufficiently rigid mechanical coupling to displays 105 such that deformation of the frame that results in a relative misalignment between displays 105 is registered by laser alignment sensor system 115.

Figure 5A:
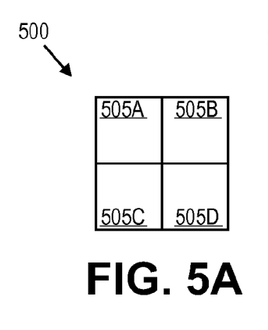
FIGS. 5A-C are block diagrams illustrating a quadrant photo-detector for measuring misalignment between right and left displays of a head mounted display, in accordance with an embodiment of the disclosure.
Figure 5B:
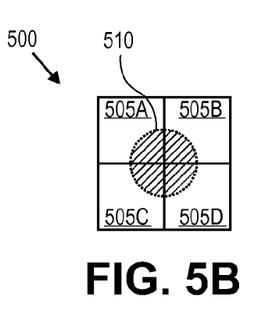
Figure 5C:
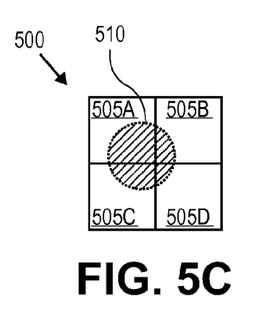

FIGS. 5A-C are block diagrams illustrating a quadrant photo-detector 500 for measuring misalignment between right and left displays of a head mounted display, in accordance with an embodiment of the disclosure. Quadrant photo-detector 500 is one possible implementation of photo-detector array 122. The illustrated embodiment of quadrant photo-detector 500 includes four photo-sensitive regions 505A, 505B, 505C, and 505D (collectively photo-sensitive regions 505). Each photo-sensitive region 505 may be implemented with a photo-diode or charge coupled device ("CCD") that captures an image charge and outputs a signal or image data indicative of the amount of light beam 510 impinging upon the given photo-diode. The output signals may then be analyzed to determine a central location or centroid of light beam 510. For example, if all photo-sensitive regions 505 acquire the same amount of image charge, then the centroid analysis would determine that the location of light beam 510 is in the middle of quadrant photo-detector 500 (FIG. 5B). However, if region 505A captures the highest image charge, region 505D captures the lowest image charge and regions 505C and 505B capture substantially equal image charges, then the centroid analysis would determine that the location of light beam 510 has moved towards the upper left quadrant (FIG. 5C). The relative magnitudes of the image charge captured by each photo-sensitive region 505 can be used to determine the central location of light beam 510, which is indicative of misalignment (or alignment) between displays 105 and correspondingly deformation (or lack thereof) of the frame.

Figure 6:
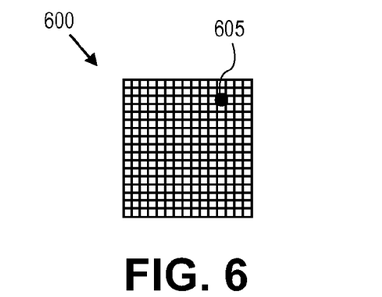
FIG. 6 is a block diagram illustrating an N by M pixel array photo-detector for measuring misalignment between right and left displays of a head mounted display, in accordance with an embodiment of the disclosure.

FIG. 6 is a block diagram illustrating an N by M pixel array 600 for measuring misalignment between right and left displays of a head mounted display, in accordance with an embodiment of the disclosure. N by M pixel array 600 is one possible implementation of photo-detector array 122. The illustrated embodiment of N by M pixel array 600 includes an N by M array of photo-sensitive imaging pixels (e.g., photo-diodes, CCD, etc.). In one embodiment, during operation of N by M pixel array 600, the location of light beam 605 maybe determined simply by which pixel captures the largest image charge, and therefore outputs the largest image data, due to light beam 605.

Rotational deformations of binocular HMD 100 may be reduced via appropriate design of the frame and selection of materials. By selecting stiffer materials and bulking up the frame strength about nose bridge 145, rotational deformations that cause right display 105A to become misaligned relative to left display 105B can be reduced. For example, binocular HMD 100 maybe fabricated of plastics molded around the sensor and control systems, hollow metal frame members in which or on which the sensor and control systems are disposed, or otherwise. However, the selection of stiffer materials and/or the bulkier frame designs may be heavy, uncomfortable, or aesthetically/functionally unpleasing. Thus, laser alignment sensor system 115 and control systems disclosed herein can provide active monitoring/tracking of frame deformation and display misalignment that can be used to generate fault signals to shut down displays 105 to prevent user disorientation upon reaching a threshold degree of deformation, issue a user warning and instructions to straighten or otherwise recalibrate the frames, or even provide active feedback to image controller 210 for real-time image compensation to counteract the effects of the mechanical deformation.

Figure 7:
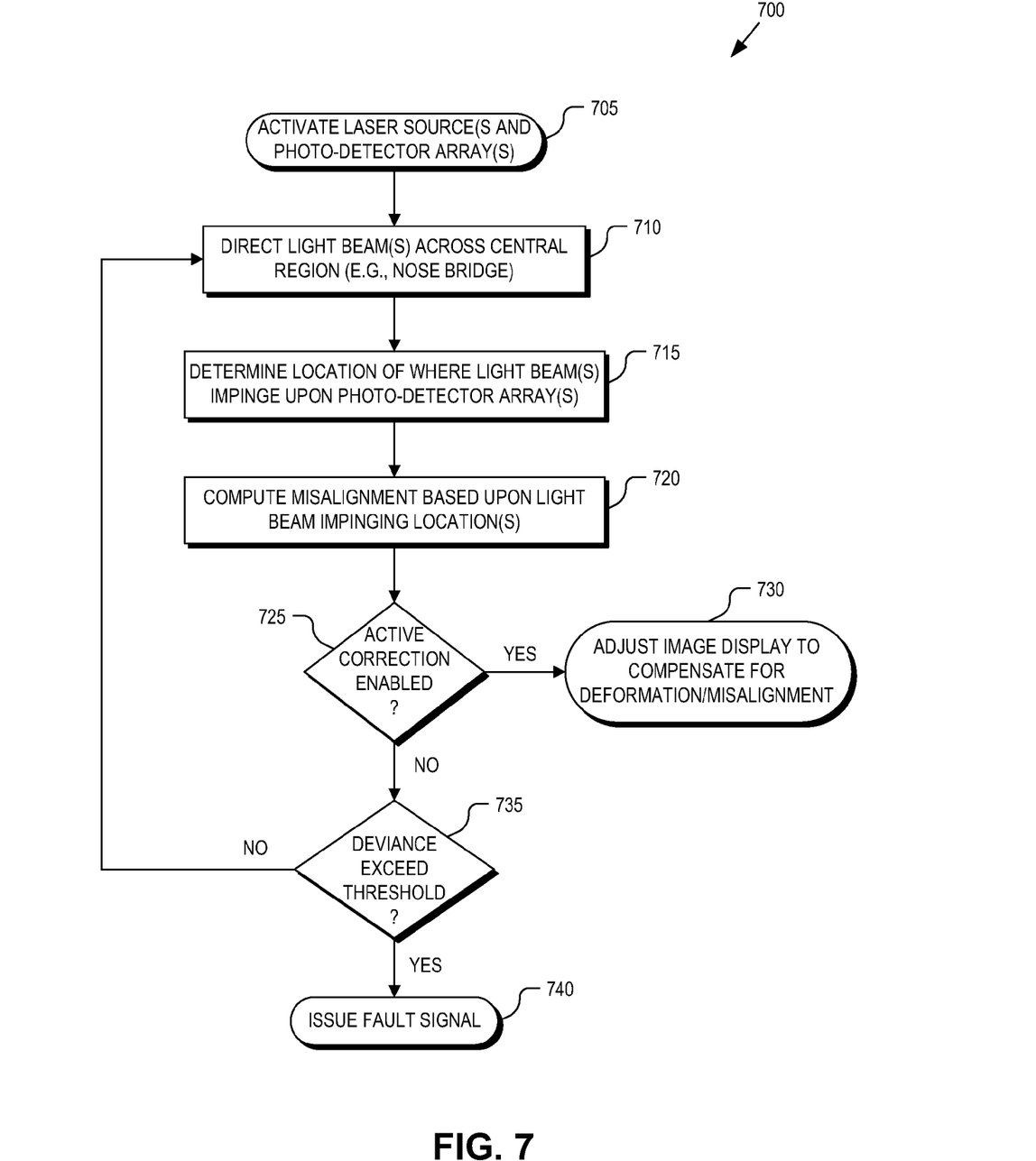
FIG. 7 is a flow chart illustrating a method of operating of a control system for monitoring misalignment between right and left displays of a head mounted display, in accordance with an embodiment of the disclosure.

FIG. 7 is a flow chart illustrating a process 700 of operating a control system for monitoring misalignment between right and left displays 105, in accordance with an embodiment of the disclosure. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel.

In a process block 705, laser alignment sensor system 115 is activated by enabling laser sources 120 and photo-detector arrays 122. Activation of laser sources 120 causes light beams to be emitted and directed across the central region (e.g., nose bridge 145) between displays 105 (process block 710). The emitted light beams impinge upon photo-detector arrays 122, which generate signals indicative of the location where the light beams strike their surfaces.

In a process block 715, the signals output from photo-detector arrays 122 are coupled into alignment controller 125 for analysis to determine the location of where the light beams impinge upon the photo-detector arrays 122. The signals may be image data collected by photo-sensitive regions within photo-detector arrays 122 (e.g., quadrant detector 500), collected by imaging pixels (e.g., N by M pixel array 600), or image data collected by various other photo-sensitive elements. Determination of the location may be accomplished by computing a centroid or central location of the light beam on the photo-detector array 122 or by identifying which pixel within an array of pixels is sensing the light beam. In one embodiment, the signals output from photo-detector arrays 122 are continuously monitored in real-time, periodically monitored, or monitored in response to a calibration request.

In a process block 720, the signals output from photo-detector arrays 122 are used to determine a relative misalignment between displays 105 and correspondingly a deformation in the frame that caused the misalignment. In one embodiment, the misalignment/deformation may be determined by comparing the light beam impinging location(s) to reference locations determined during a previous user calibration or otherwise previously preset locations. The comparison may be executed by alignment controller 125 and the reference location may have be a measured output from photo-detectors 122 when the frame was known to be in alignment or non-deformed state. The magnitude and direction of the location offsets between the currently measured locations and the reference locations may then be used to determine the direction and magnitude of the misalignment due to frame deformation about the rotational deformation axes.

If binocular HMD 100 is configured to perform real-time active correction (decision block 725), then process 400 continues to a process block 730. In process block 730, the determined misalignment is used to apply active image correction to the CGIs displayed by displays 105. In this manner, image correction can be used to overcome mechanical frame deformations and bring the right and left CGIs back into alignment despite continued presence of the physical deformations. In one embodiment, image controller 210 is coupled to alignment controller 125 to receive real-time misalignment feedback and calculate the necessary image adjustments, which may include horizontal or vertical translations, keystoning, and/or various other image pre-distortion corrective measures.

If the frame deformation becomes too great for active image correction or if the particular embodiment of binocular HMD 100 does not support active image correction, then it may be determined whether the misalignment exceeds a threshold amount. Thus, in decision block 735, it is determined whether the misalignment exceeds a threshold value. If not, process 700 returns to process block 710 for continued monitoring. If so, process 700 continues to a process block 740. In process block 740, a fault signal is issued warning the user. The fault signal may disable displays 105 or even display a warning message to the user on displays 105. In one embodiment, the warning message may include an indication of how to correct the deformation in the frame (e.g., symbols illustrating corrective twisting measures to realign the frame). As the user realigns the frame by applying counter forces to correct the frame deformation, the displays may display an alignment indicator to guide the user in real-time and may eventually return to regular operation once the deformation is reduced below a threshold value. Other types of warning or error signals may also be issued and/or displayed, such as an audible warning.

Figure 8A:
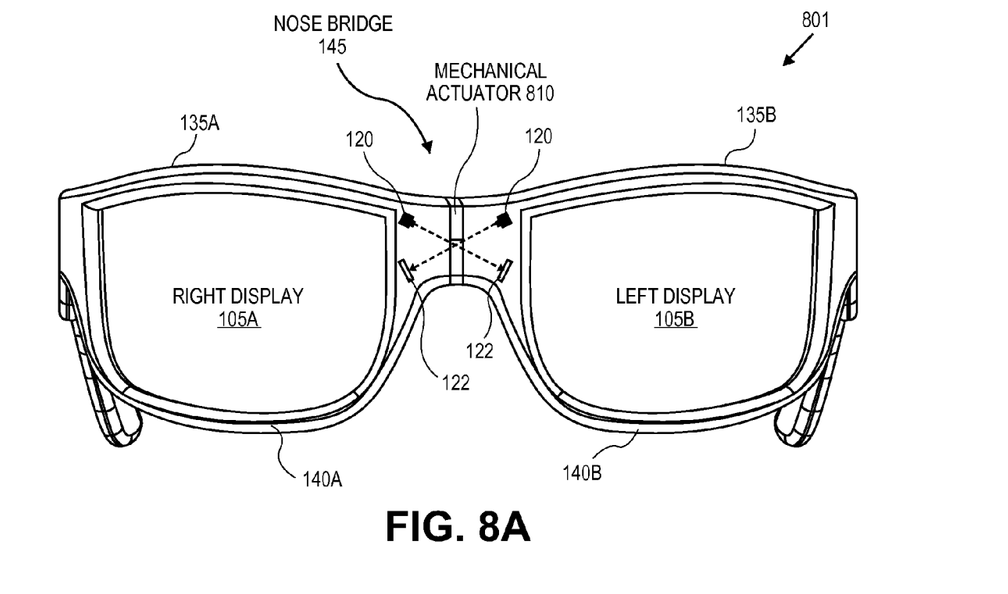
FIGS. 8A and 8B are frontal views of head mounted displays that include one or more a mechanical actuators to correct frame deformations, in accordance with an embodiment of the disclosure.
Figure 8B:
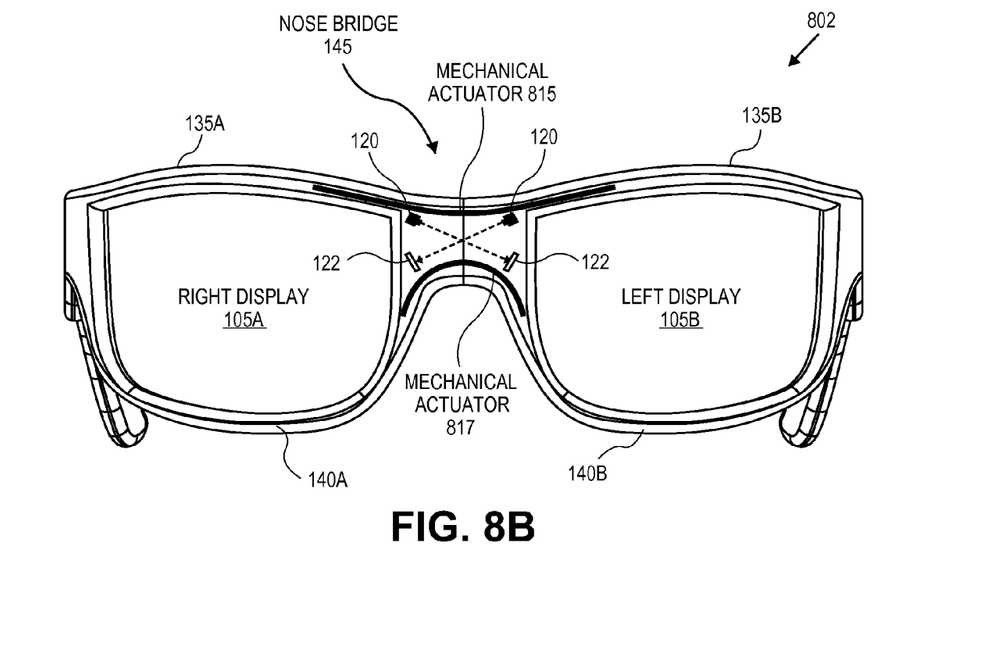

FIGS. 8A and 8B are frontal views of HMDs 801 and 802 that include various embodiments of mechanical actuators to correct frame deformations, in accordance with an embodiment of the disclosure. FIG. 8A illustrates a mechanical actuator 810 disposed in nose bridge 145 between displays 105. Mechanical actuator 810 may be a single actuator device or multiple independent actuator devices that are coupled to alignment controller 125 to be responsive to feedback control signals there from. Mechanical actuator 810 may impart counter forces on the frame at nose bridge 145 to mechanically correct for small misalignments between displays 105. For example, small misalignments may include small creeps in optics due to temperature variations, small forces, etc. This mechanical re-alignment may occur continuously in real-time (i.e., active alignment) or during a startup initialization phase each time the HMD 801 is turned on.

FIG. 8B illustrates a mechanical actuators 815 and 817 disposed across nose bridge 145 between displays 105. Mechanical actuators 815 and 817 are coupled to alignment controller 125 to be responsive to feedback control signals there from. Mechanical actuators 815 and 817 may impart counter forces (compressive or tensile) on the frame across nose bridge 145 to mechanically correct for small misalignments between displays 105. This mechanical re-alignment may occur continuously in real-time or during a startup initialization phase when the HMD 801 is turned on. Mechanical actuators 810, 815, or 817 may be implemented using a shape memory alloy, a functional polymer, a piezo-electric actuator, a microelectromechanical system ("MEMS") actuator, or other mechanical or electro-mechanical actuating devices. The mechanical correction provided by any of mechanical actuators 810, 815, or 817 may be in addition to the image correction discuss above or in lieu thereof.

The processes explained above are described in terms of computer software and hardware. The techniques described may constitute machine-executable instructions embodied within a tangible machine (e.g., computer) readable storage medium, that when executed by a machine will cause the machine to perform the operations described. Additionally, the processes may be embodied within hardware, such as an application specific integrated circuit ("ASIC") or the like.

A tangible machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A binocular head mounted display, comprising:
a frame for wearing on a head of a user;
right and left displays for displaying right and left images to the user, wherein the right and left displays are mounted to the frame;
a first alignment sensor including a first laser source mounted proximate to one of the right or left displays and a first photo-detector array mounted opposite the first laser source and proximate to an opposite one of the right or left displays, the first alignment sensor mounted to measure misalignment between the right and left displays due to deformation of the frame about one or more rotational axes and to generate a first signal that is indicative of the misalignment; and
a control system coupled to the first alignment sensor to receive the first signal and including logic to calculate the misalignment based at least in part upon the first signal.

2. The binocular head mounted display of claim 1, wherein the first laser source is positioned to direct a light beam across a nose bridge region of the binocular head mounted display between the right and left displays and impinge upon the first photo-detector array, wherein a location of where the light beam impinges upon the first photo-detector array is indicative of the misalignment between the right and left displays.

3. The binocular head mounted display of claim 2, wherein the first photo-detector array comprises a quadrant detector having four photo-sensitive regions and wherein the logic of the control system includes first logic to determine a central location of where the first light beam impinges upon the quadrant detector based upon relative intensities of photo-sensitive signals acquired by each of the four photo-sensitive regions and second logic to determine the misalignment based at least in part upon the determined central location.

4. The binocular head mounted display of claim 2, wherein the first photo-detector array comprises an N by M pixel array and wherein the logic of the control system determines the location of where the light beam impinges upon the first photo-detector array based at least in part upon which pixel within the N by M pixel array senses the light beam.

5. The binocular head mounted display of claim 1, further comprising:
a second alignment sensor including a second laser source mounted to one of the left or right displays and a second photo-detector array mounted to an opposite one of the left or right displays relative to the second laser source, the second alignment sensor coupled to measure misalignment between the right and left displays due to the deformation of the frame about the one or more rotational axes and to generate a second signal that is indicative of the misalignment,
wherein the second alignment sensor is physically offset from the first alignment sensor,
wherein the control system is further coupled to the second alignment sensor to receive the second signal and the logic is further coupled to calculate the misalignment based at least in part upon the first and second signals.

6. The binocular head mounted display of claim 5, wherein the first and second alignment sensors are each physically orientated to direct a substantially horizontal light beam across a nose bridge region of the head mounted display.

7. The binocular head mounted display of claim 5, wherein the first and second alignment sensors are each physically orientated to direct a diagonal light beam across a nose bridge region of the head mounted display such that the first alignment sensor optically registers an upper portion of the right display to a lower portion of the left display and the second alignment sensor optically registers an upper portion of the left display to a lower portion of the right display.

8. The binocular head mounted display of claim 5, wherein the one or more rotational axes comprise a substantially vertical axis passing through the nose bridge region of the frame about which a first rotational deformation through the nose bridge may occur and a substantially longitudinal axis passing through the nose bridge region about which a torsional deformation through the nose bridge may occur.

9. The binocular head mounted display of claim 5, wherein the control system includes further logic to generate feedback signals indicative of the misalignment, the binocular head mounted display further comprising:
a right display controller coupled to the control system to receive at least a portion of the feedback signals and to adjust the right image to compensate for the misalignment to bring the right image back into alignment; and
a left display controller coupled to the control system to receive at least a portion of the feedback signals and to adjust the left image to compensate for the misalignment to bring the left image back into alignment.

10. The binocular head mounted display of claim 1, further comprising a mechanical actuator disposed at a nose bridge region of the frame, the mechanical actuator coupled to the control system to mechanically correct the misalignment between the right and left displays in response to the calculated misalignment.

11. The binocular head mounted display of claim 10, wherein the mechanical actuator extends across the nose bridge region.

12. The binocular head mounted display of claim 11, wherein the mechanical actuator comprises at least one of a shape memory alloy, a functional polymer, a piezo-electric actuator, or a microelectromechanical system ("MEMS") actuator.

13. A method of tracking alignment between right and left displays of a binocular head mounted display ("HMD"), the method comprising:
directing a first light beam across a central region of the binocular HMD between the right and left displays from a first laser source mounted proximate to one of the right or left displays to impinge upon a first photo-detector array mounted opposite the first laser source and proximate to an opposite one of the right or left displays;
determining a first location of where the first light beam impinges upon the first photo-detector array; and
monitoring a misalignment between the right and left displays based at least in part on the first location, wherein the misalignment is caused at least in part by a deformation of a frame of the binocular HMD that supports the right and left displays.

14. The method of claim 13, wherein monitoring the misalignment between the right and left displays comprises:
monitoring the misalignment due to a first rotational deformation of the frame about a first rotational axis passing through a central nose region of the frame between the right and left displays of the binocular HMD; and
monitoring the misalignment due to a second rotational deformation of the frame about a second rotational axis passing through the central nose region, wherein the second rotational axis is different than the first rotational axis.

15. The method of claim 14, wherein the first rotational deformation is caused at least by inward or outward forces that spread or compress ear arm members of the frame, wherein the second rotational deformation is caused at least in part by opposing upward and downward forces applied to the ear arm members.

16. The method of claim 13, further comprising:
directing a second light beam across the central region of the binocular HMD from a second laser source mounted proximate to one of the right or left displays to impinge upon a second photo-detector array mounted opposite the second laser source and proximate to an opposite one of the right or left displays;
determining a second location of where the second light beam impinges upon the second photo-detector array; and
monitoring the misalignment between the right and left displays based at least in part on the first and second locations.

17. The method of claim 16, wherein the first and second light beams are offset from each other and run along substantially parallel paths, wherein the first photo-detector array and the first laser source optically register an upper portion of the right display to an upper portion of the left display, and wherein the second photo-detector array and the second laser source optically register a lower portion of the right display to an lower portion of the left display.

18. The method of claim 16, wherein the first and second light beams run along substantially diagonal paths, wherein the first photo-detector array and the first laser source optically register an upper portion of the right display to a lower portion of the left display, and wherein the second photo-detector array and the second laser source optically register a upper portion of the left display to an lower portion of the right display.

19. The method of claim 13, wherein the first photo-detector array comprises a quadrant detector having four photo-sensitive regions and wherein determining the first location of where the first light beam impinges upon the first photo-detector array comprises:
determining a central location of where the first light beam impinges upon the quadrant detector based upon relative intensities of photo-sensitive signals acquired by each of the four photo-sensitive regions.

20. The method of claim 13, wherein the first photo-detector array comprises an N by M pixel array and wherein determining the first location of where the first light beam impinges upon the first photo-detector array comprises:
determining which pixel within the N by M pixel array senses the first light beam.

21. The method of claim 13, further comprising:
issuing a fault signal if the misalignment exceeds a threshold misalignment.

22. The method of claim 21, further comprising:
displaying an alignment indicator on one or both of the right or left displays to provide a user of the binocular HMD with real-time visual alignment feedback while adjusting the deformation of the frame.

23. The method of claim 13, further comprising:
generating right and left images with the right and left displays, respectively; and
applying active image correction to at least one of the right or left images based upon the misalignment to compensate for the deformation of the frame that causes the misalignment between the right and left displays.

24. A binocular head mounted display ("HMD"), comprising:
- a frame;
- right and left displays mounted to the frame, the right and left displays for generating right and left images, respectively;
- a laser alignment sensor system coupled to the right and left displays and oriented to direct a light beam across a nose bridge region of the binocular HMD and optically register alignment between the right and left displays; and
- a control system disposed in or on the frame and coupled to the laser alignment sensor system, the control system including logic that, when executed, causes the control system to perform operations comprising:
  - receive alignment signals from the laser alignment sensor system indicative of a misalignment between the right and left displays;
  - determine the misalignment based upon the alignment signals; and
  - apply active image correction to at least one of the right or left images based upon the misalignment to compensate for deformation of the frame that causes the misalignment between the right and left displays.

25. The binocular HMD of claim 24, wherein the laser alignment sensor system comprises:
- a first laser source to generate a first light beam mounted proximate to one of the right or left displays; and
- a first photo-detector array mounted opposite the first laser source and proximate to an opposite one of the right or left displays, the first photo-detector to generate a first alignment signal indicative of a first location where the first light beam impinges upon the first photo-detector.

26. The binocular HMD of claim 25, wherein the laser alignment sensor system further comprises:
- a second laser source to generate a second light beam mounted proximate to one of the right or left displays; and
- a second photo-detector array mounted opposite the second laser source and proximate to an opposite one of the right or left displays, the second photo-detector to generate a second alignment signal indicative of a second location where the second light beam impinges upon the second photo-detector.

27. The binocular HMD of claim 26, wherein the first and second laser sources are oriented to output the first and second light beams along substantially diagonal paths through the nose bridge region.

28. The binocular HMD of claim 24 wherein the photo-detector comprises a quadrant detector.

* * * * *